United States Patent Office.

THEODORE JARVIS, OF NEW YORK, N. Y.

Letters Patent No. 96,437, dated November 2, 1869.

IMPROVED SALVE.

The Schedule referred to in these Letters Patent and making part of the same.

*To whom it may concern:*

I, THEODORE JARVIS, of New York city, in the county of New York, State of New York, have invented a certain compound called "Jarvis' Universal Salve," to be used for all kinds of sores, corns, chilblains, bunions, piles, erysipelas, felons, &c.

My invention consists in mixing the following ingredients in the following proportions: four pounds fresh lard, put in a kettle and strained boiling hot; two pounds gum-turpentine; two pounds of beeswax, cut in small pieces; one pound of rosin. Stand till all is dissolved.

Having described my invention,

What I claim as new, and desire to claim as Letters Patent, is—

A salve composed of the ingredients, in the proportions and for the purpose set forth.

Witnesses: THEODORE JARVIS.
JOHN A. KEELING,
WM. W. CONNOLLY.